June 15, 1948.   I. C. MADDEN   2,443,468
SELF-TAUGHT EDUCATIONAL CLOCK
Filed March 3, 1945
Fig. 1
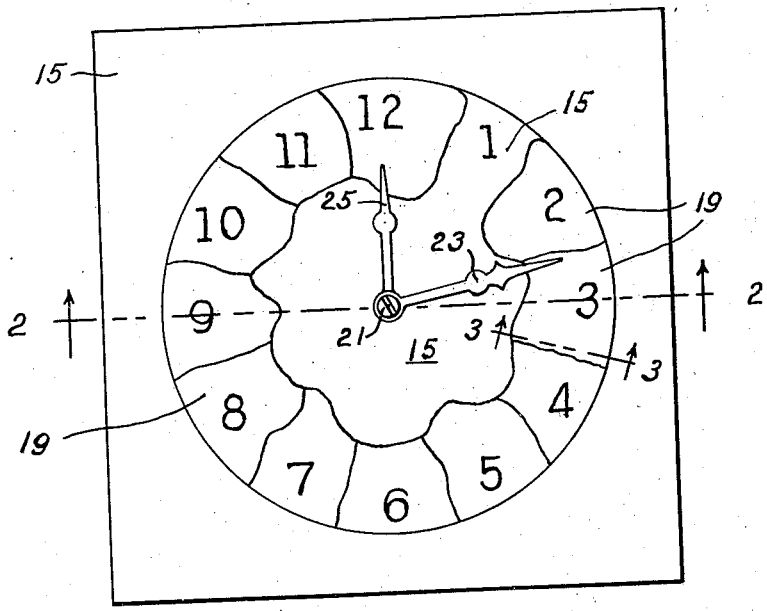
Fig. 2
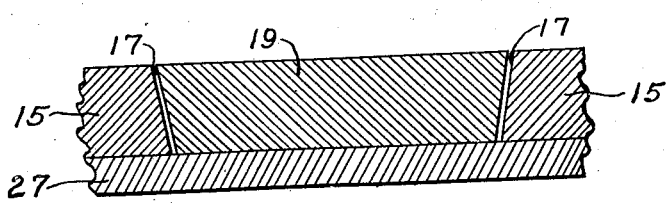
Fig. 3
INVENTOR
*Ira C. Madden*
BY
ATTORNEY Patented June 15, 1948

2,443,468

UNITED STATES PATENT OFFICE 2,443,468

SELF-TAUGHT EDUCATIONAL CLOCK

Ira C. Madden, Detroit, Mich.

Application March 3, 1945, Serial No. 580,744

1 Claim. (Cl. 35—39)

My invention pertains to educational toys or appliances and more particularly to self-taught toys whereby children between the ages of 4 and 7, approximately, are aided in learning to count and tell time.

It is an object of my invention to provide a self-taught toy or educational clock in a convenient and attractive arrangement for encouraging children to learn to count and tell time.

It is also an object of my invention to provide an educational self-taught toy embodying a simplified construction which is simple to manufacture and which is very convenient to assemble or take apart.

It is a further object of my invention to provide such an educational self-taught toy wherein the cooperative edges of interfitting portions are especially conformed so as to facilitate assembly and removal.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a plan view showing my educational self-taught clock;

Fig. 2 is a cross-sectional view taken on line 2—2 in Fig. 1; and

Fig. 3 is a fragmentary enlarged sectional view taken on line 3—3 in Fig. 1, and substantially enlarged.

Referring more specifically to Fig. 1 of the drawing, it will be seen that my educational self-taught clock toy comprises a clock face or dial 15 having most of the dial numeral portion recessed or cut out to provide a recess 17 for receiving dial numeral blocks 19 inserted thereinto. Each of the dial numeral blocks carries a different one of the usual clock dial numerals, which may be painted or applied thereon in any convenient manner, and which are preferably Arabic numerals, in order to be useful for teaching small children to count and to tell time. The recess 17 in the clock face is made of an irregular shape throughout so that the dial numeral blocks, made of corresponding irregular shapes, can only be inserted each into its proper cooperative position in the clock face, and the different respective numerals of the dial will then be placed in the proper cooperative relation or sequence. Although one certain irregular shape of recess and blocks is shown which serves this purpose, it will be understood that any desired irregular conformations may be utilized which will serve the same purpose.

In order to aid the child in starting the proper sequence of numerals in the dial, a portion of the clock face 15 remains stationary and unrecessed so that it permanently displays one of the dial numerals. As shown, this may be the numeral "1," although various other ones of the numerals might be made similarly permanent and stationary in the dial to provide a reference point for guiding the insertion of the dial numeral blocks.

To still further facilitate the insertion and removal of the dial blocks 19, the edge surfaces of the blocks and the cooperative edge surfaces of the recess 17 are made bevelled and diverging outwardly so the recess is wider at the top than at the bottom, as shown more clearly in Fig. 3. Not only does this arrangement make insertion and removal of blocks easy but it also eliminates the possibility of a block being wedged or stuck when an attempt is made to insert it into a wrong position in the recess in the clock face. Inserting the dial numeral blocks into the clock face not only serves to teach the child the arrangement of the clock, but also teaches him to count, and to recognize the numerals.

The central and unrecessed portion of the clock face 15 is provided with a centrally disposed pivot pin or screw 21 whereon the inner ends of a minute hand 23 and an hour hand 25 are pivotally mounted so that the outer ends of these hands may be conveniently adjusted over various ones of the dial numerals. The children can also play "telling time" by setting the hands to match the household clock. They will enjoy setting the clock to represent their bed time, lunch time, etc., and this creates an interest in telling time.

To close the back of the recessed clock face it is preferably provided with a backboard 27 secured to the rear side of the clock face, in any suitable manner.

The clock face, the dial numeral blocks and the backboard may be made of wood, plastic or any other suitable materials, and the dial numerals, and the circle representing the dial on the face, and the minute divisions, may be marked by painting, or in any other suitable manner as desired. The corners and central portion of the clock face are preferably ornamented or embellished.

This invention may be developed within the scope of the following claim, without departing from the spirit of the invention, and it is desired that the specification and drawing be read as being merely illustrative of a particular embodiment of the invention and not in a strictly limiting sense.

What I claim is:

An educational clock comprising a clock face having a continuous elongated recess therein, said clock face being unrecessed in at least one dial numeral position, a plurality of individually shaped blocks bearing dial numerals, each of said blocks being conformed in respect to said recess and to each other so as to occupy only one predetermined position in said recess, a minute hand, an hour hand, and means pivotally securing said hands to a central unrecessed portion of said clock face.

IRA C. MADDEN.

REFERENCES CITED

The following references are of record in the file of this patent:

UNITED STATES PATENTS

| Number | Name | Date |
| --- | --- | --- |
| 110,213 | Day | Dec. 20, 1870 |
| 510,178 | Konig | Dec. 5, 1893 |
| 723,288 | Lewis | Mar. 24, 1903 |
| 802,807 | Fitch | Oct. 24, 1905 |
| 1,276,344 | Gilman | Aug. 20, 1918 |
| 1,356,929 | Lewers | Oct. 26, 1920 |
| 1,972,206 | Thomay | Sept. 4, 1934 |
| 2,037,966 | Dailey | Apr. 21, 1936 |